Feb. 28, 1967  J. F. HOBBINS  3,306,126
GEAR SHIFT MECHANISM
Filed May 11, 1965
3 Sheets-Sheet 1
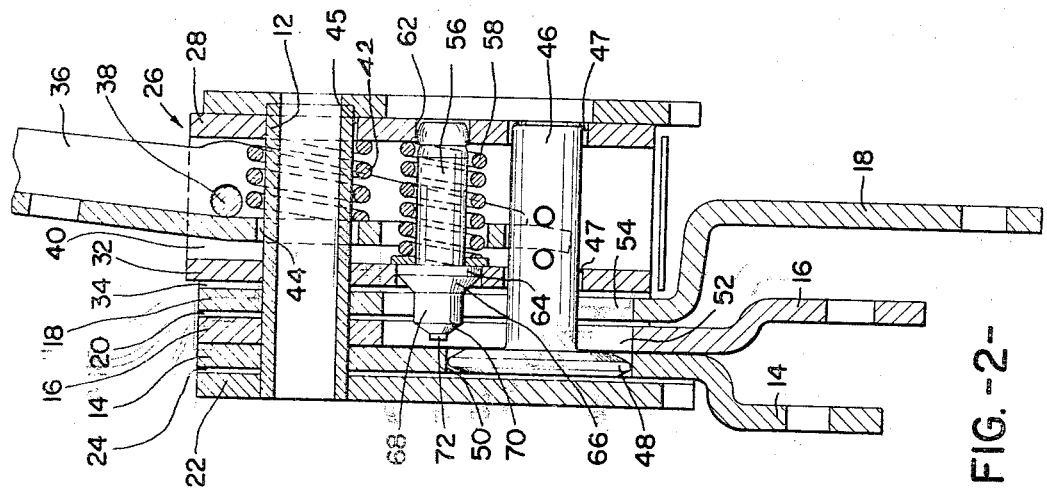
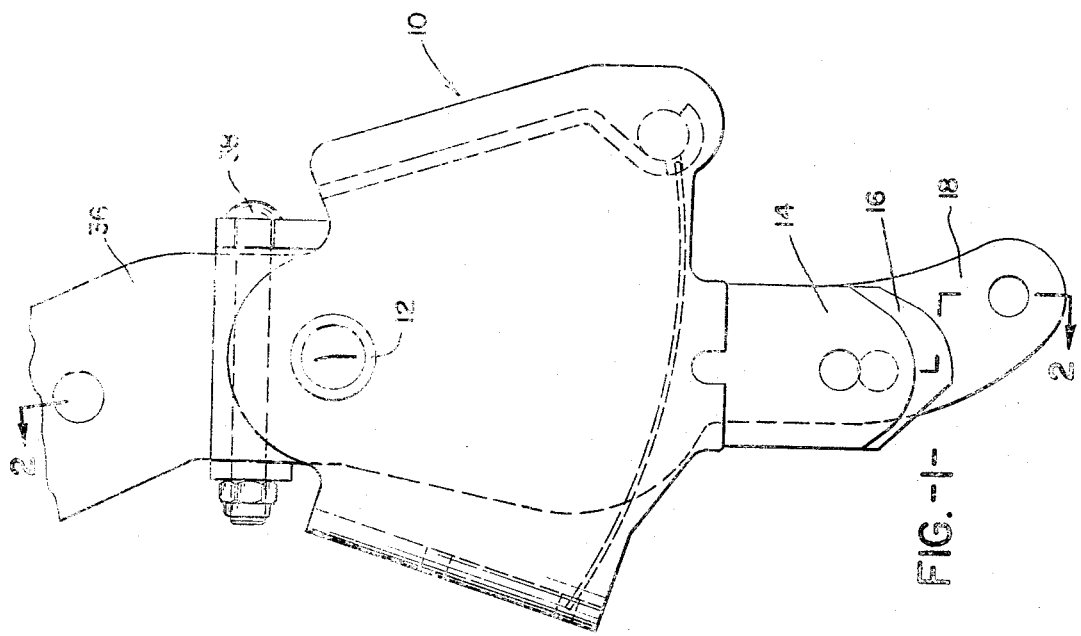
INVENTOR.
JAMES FRANCIS HOBBINS
BY
ATTORNEY

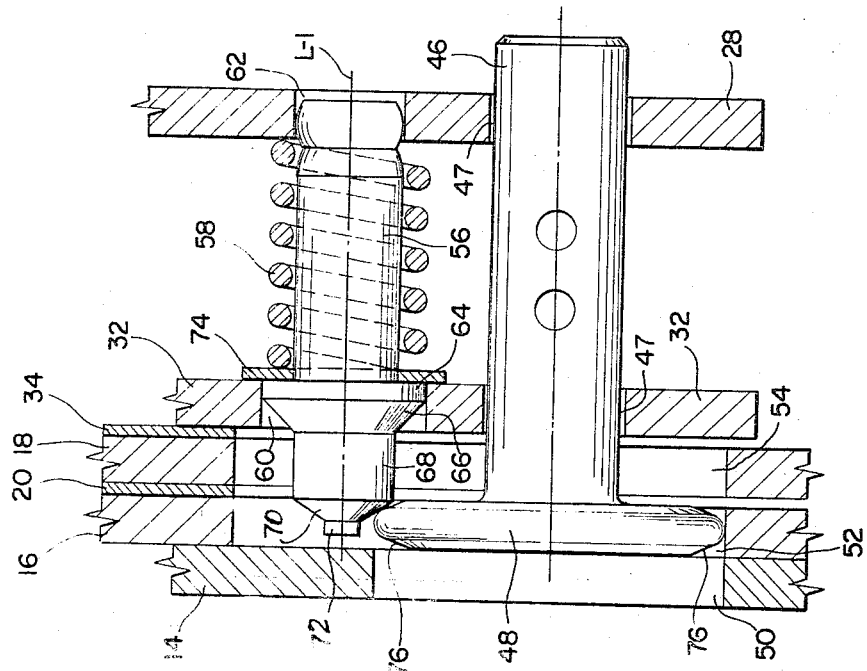
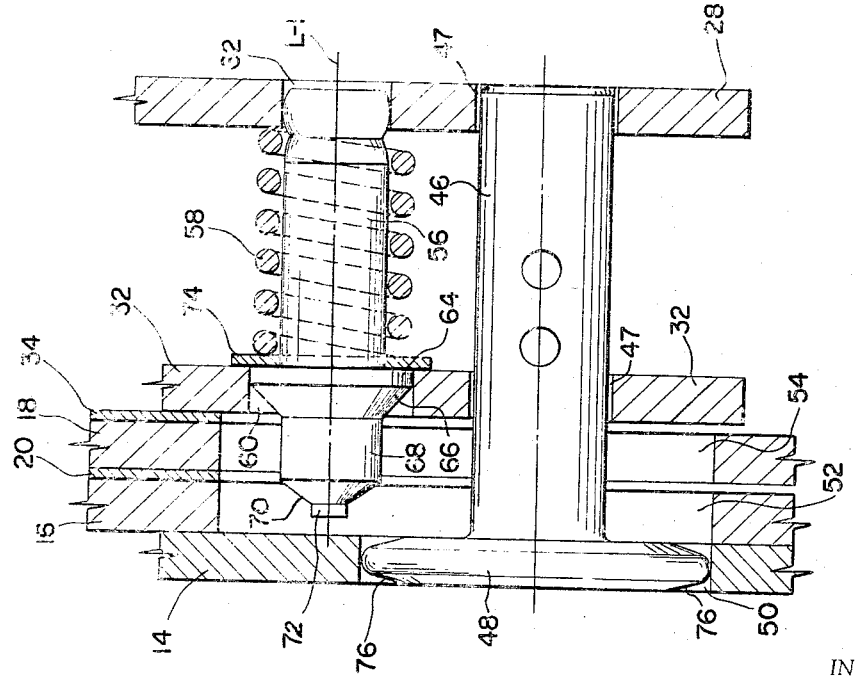

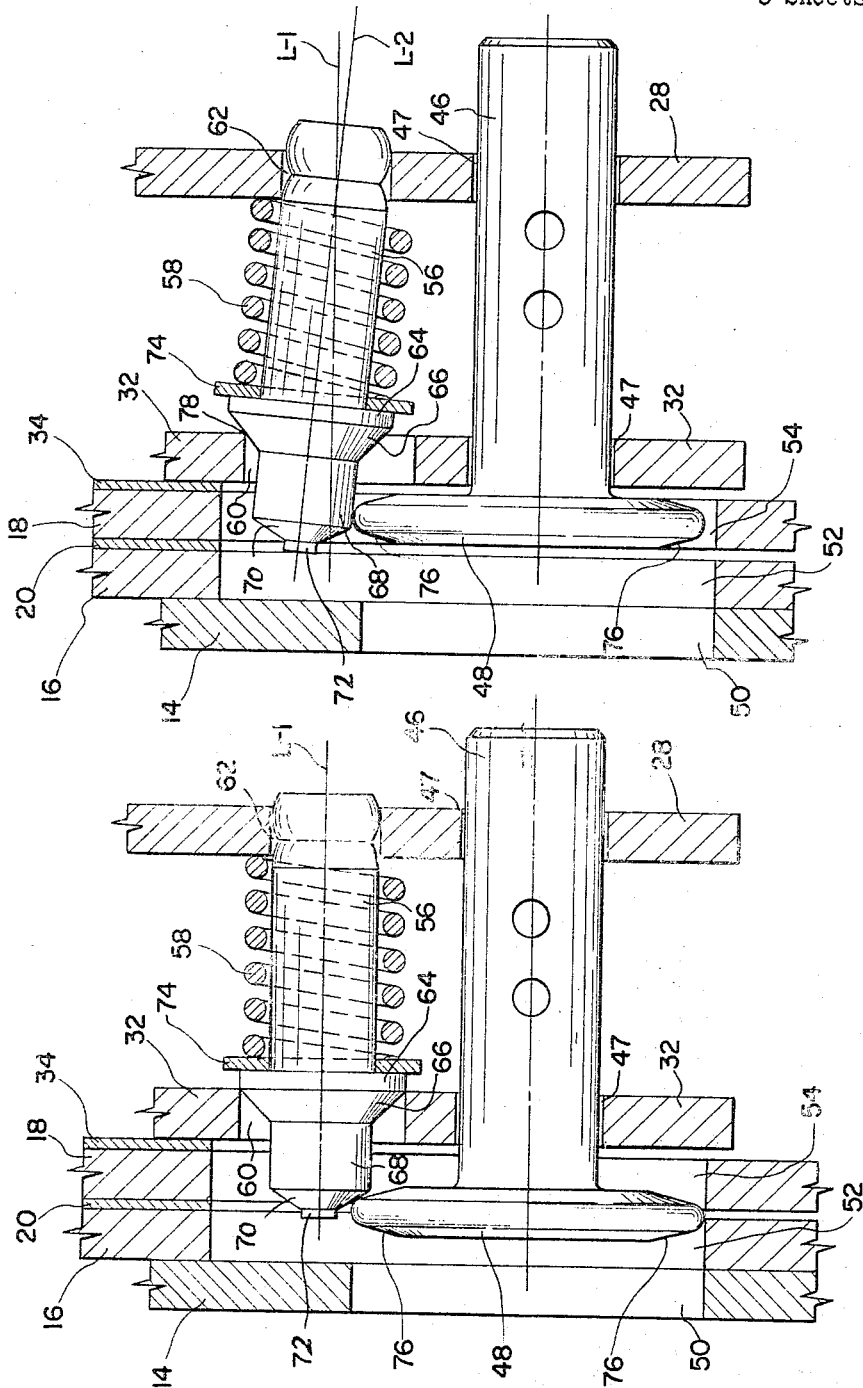

_United States Patent Office_

3,306,126
Patented Feb. 28, 1967

3,306,126
GEAR SHIFT MECHANISM
James Francis Hobbins, Philadelphia, Pa., assignor to Hurst-Campbell, Inc., Glenside, Pa., a corporation of Pennsylvania
Filed May 11, 1965, Ser. No. 456,042
4 Claims. (Cl. 74—473)

This invention relates to a reverse action spring arrangement for use in various spring-loaded or spring-biased applications.

Normally, a compression spring offers zero resistance as long as it is fully relaxed. But, as the spring is compressed, its resistance increases as a straight line function of the load applied. In other words, as the compression of the spring increases, so does the force it exerts on the load-applying element.

One object of this invention is to produce an arrangement whereby, the effective force exerted by a spring against the spring compressing element is at its greatest upon initial compression of the spring and wherein the force exerted by the spring is diverted from the spring loading or compressing element. For example, if a door that is normally closed by a spring, it follows that, the more the door is opened, the greater the resistance of the spring will become. According to this invention, once the initial resistance of the spring has been overcome, the door can be opened further without any increase in the resistance of the spring.

As herein illustrated, my invention is shown applied to the reverse gear actuating lever of a gear shifting mechanism of the type used in automobiles so as to provide maximum resistance which must be overcome before the transmission can be shifted to reverse gear position, and so as to provide minimum resistance to the further movement of the reverse gear actuating lever whereby the operator is made aware that he is about to shift into reverse, and whereby the actual shifting into reverse gear position is accomplished under minimal pressure of the spring. In fact, by an arrangement embodying my invention the minimum residual pressure of the spring is exerted in such a manner as to give the shifting stick the desired feel without requiring the exertion of appreciable force by the person moving the shifting stick or handle.

It is therefore the object of this invention to provide a novel spring deflector which permits the application of a substantial, initial spring force to resist initial movement of the gear shift stick, the force of the spring being quickly, greatly reduced so as to permit substantially free continued movement of shifting stick so as to permit completing the shifting operation into reverse gear with the exertion of a greatly reduced force.

The full nature of the invention will be understood from the following specification and the accompanying drawings in which:

FIG. 1 is a side elevational view of a gear shifting mechanism incorporating the invention.

FIG. 2 is a cross section taking along line 2—2 of FIG. 1.

FIGS. 3, 4, 5, and 6 are enlarged fragmentary, sectional views showing the parts of invention in various operative positions.

Except for having four forward speeds instead of three, the gear shifting mechanism to which the invention is shown applied, may be of the type disclosed in our Patent No. 3,052,135 to which reference may be had for a detailed description of the structure and operation of the gear shift mechanism, as such. But, to make reference to that, or another, patent unnecessary, so much of the gear shifting mechanism as is necessary for understanding this invention has been shown, and briefly described.

As will best be seen from FIGS. 1 and 2, a gear shifting mechanism of the type to which this invention is applicable, includes a housing 10 which is suitably secured to the transmission casing or to an adjacent part of the chassis and which carries a horizontal sleeve 12 for rotatably supporting third and fourth forward motion gear actuating lever 14, first and second forward motion gear actuating lever 16, and reverse motion gear actuating lever 18. It will be understood that the lower ends of these levers are connected, by suitable linkage, not shown, to the respective gear trains of the transmission as shown, for example, in the patent aforesaid. Gear actuating lever 16 is preferably spaced from gear actuating lever 18 by an interlock plate 20 and lever 14 is spaced from the adjacent wall 22 of housing 10 by a waveplate 24 which serves to tension the various levers to reduce, or prevent, rattling.

Sleeve 12 also rotatably supports a U-shaped carrier 26, one side wall 28 of which abuts sidewall 30 of housing 10 and the other side wall 32 of which is spaced from reverse gear actuating lever 18 by a safety plate 34 which prevents the reverse gear actuating lever from rotating with the rotation of U-shaped carrier 26. A shifting stick or handle 36 is secured to U-shaped carrier 26 by means of a bolt or the like, 38, which passes through the stick and through the bight or intermediate wall 40 of U-shaped carrier 26 and through a wall of housing 10. The shifting handle is normally biased into the position of FIG. 2 by means of a spring 42 which is carried by sleeve 12. It will be noted that shafting stick 36 is provided with openings 44 and 45 which are so dimensioned so as to permit the shifting stick to be rocked in the direction of the axis of the sleeve in addition to being rotated transversely of the axis of said sleeve in the usual manner.

The lower end of shifting handle 36 engages a selector pin 46 which is movable in the direction of its axis in aligning openings 47 formed in limbs or side walls 28 and 32 of U-shaped carrier 26 and is provided with an enlarged engaging head 48 which is adapted to enter opening 50 in third and fourth gear actuating lever 14, or opening 52 in gear shift actuating lever 16, or opening 54 in reverse gear shift actuating lever 18, selectively to integrate the shifting stick 36 with one or the other of said gear shift actuating levers. See FIGS. 3 to 6 in which wave plate 24 has been omitted.

It will be noted from the foregoing that when the shifting stick 36 is in the neutral position and if it is unrestrained, it will assume the position of FIG. 2 in which selector pin engaging head 48 engages opening 50 in gear shift actuating lever 14 so that, if the handle 36 is moved transversely of the axis of sleeve 12, the transmission will be shifted to third or fourth foward gear position according to the direction of movement of the shifting handle.

The parts thus far described and their operation form no part of the present invention and have been shown and described only to furnish the necessary background and to minimize the necessity of reference to our patent aforesaid.

In order to prevent unintended movement of the shifting handle into reverse gear position, I provide a plunger 56 which is biased to the left, as viewed in FIG. 2, by spring 58 and which is movable, in the direction of its axis, in openings 60 and 62 formed in the side walls 28 and 32 of carrier 26. Plunger 56 is provided with a cylindrical rim 64 which fits snugly in opening 60 and which is connected by means of a conical portion 66, to a cylindrical stem 68 which terminates in a conical portion 70. The movement of plunger 56 in response to spring 58 is limited by abutment plate 74 which is fixed on the plunger. By inspection of FIGS. 3 and 4, it will be seen that, when spring 58 is fully expanded, its axis and the axis of plunger 56 will be parallel to the axis of selector pin 46 as indicated by lines L–1. In this position, the conical portion 70 of plunger 56 will be in the path of movement of engaging head 48 from the position of FIG. 3 to the position of FIG. 4 from whch it will be seen that as engaging head 48 is moved into opening 52 in gear actuating lever 16, its rim 76 will abut conical surface 70 of the plunger. It follows that, to move engaging head 48 out of opening 52 into opening 54 in reverse gear actuating lever 18, plunger 56 must be moved, against the force of spring 58, from the position of FIG. 4 through the position of FIG. 5 and into the position of FIG. 6. It will be noted that, in the position of FIG. 6, the cylindrical portion 64 of plunger 56 is moved out of opening 60 and that, because conical portion 66 is smaller than opening 60, plunger 56 will be cocked, as indicated by line L–2. In this position, the the force of spring 58 will be exerted against the abutment 78 of conical surface 66, against the upper edge of opening 60. It will also be seen that, in the position of FIG. 6, rim 76 of engaging head 48 bears against the cylindrical surface 68 of the plunger and serves to maintain the plunger in the cocked position of line L–2. Obviously, when engaging head 48 bears against cylindrical portion 68, it is not subjected to any appreciable force of spring 58.

The peripheral portion 76 of engaging head 48 is cammed, or bevelled, so as to slide easily over conical surface 70 and over the junction of this surface 70 with cylindrical surface 68. But, it will be understood that the rim of engaging head 48 can slide off conical surface 70 and on to cylindrical surface 68 only after its cylindrical rim 64 has fully emerged from opening 60. This means that, for engaging head 48 to move through the positions of FIGS. 4 and 5, it must overcome the full resistance of spring 58. It also means that, by the time that engaging head 48 has entered opening 54 in reverse gear actuating lever 18, plunger 56 will have been cocked, as in FIG. 6, and engaging head 48 and gear actuating lever 18 will be substantially free of the force of spring 58.

From the foregoing, it will be seen that shifting from third and fourth gear position to first and second gear position involves partial compression of spring 42 and that shifting from first and second gear position to reverse gear position involves the further compression of spring 42 and the simultaneous compression of spring 58. This greatly increased resistance puts the driver on notice that he is shifting into reverse gear and effectively prevents a driver from inadvertently shifting to reverse gear position.

It will be clear from the foregoing that, as far as the driver is concerned, spring 58 presents resistance, not when it is at minimum, not at maximum, compression. In practical terms it means that, once having overcome the initial, warning-giving resistance, the driver can shift into reverse without having to overcome the constantly increasing resistance of spring 58, the increased compression of the spring itself, notwithstanding.

I claim:
1. In combination, a frame have spaced axially aligned first and second openings,
    a member having a first end portion movably engaging said first opening and having a second end portion,
    said second end portion comprising:
    a large portion located inwardly of the extreme end of the member and snugly engaging said second opening,
    a small portion outwardly of said large position and
    a spring co-axial with and normally biasing said member in a direction to keep said large portion in said opening to maintain said member in a first position in which it is substantially co-axial with said openings,
    said spring being compressible to permit movement of said large portion inwardly out of said second opening and the movement of said small portion inwardly into said second opening whereby said member may be moved into a second position in which its axis is at an angle to the axis of said openings.

2. The combination of a gear shifting mechanism of the type which includes:
    a reverse gear actuating lever,
    a shifting handle,
    an engaging head movable by said handle toward, and away from, said reverse gear actuating lever, controllably to engage said handle with, or to disengage it from, said reverse gear actuating lever, of:
    means for preventing inadvertent engagement of said engaging head with said reverse gear actuating lever, said means comprising:
    a structure defining spaced co-axial first and second openings,
    a member having a first end portion reciprocable in said first opening and having a second end portion reciprocable in said second opening,
    said second end portion having:
    a large segment which is located inwardly of the extreme end of said member and which fits snugly in said second opening;
    said second end portion also having a small segment which is disposed outwardly of said large segment and which fits loosely in said second opening, and
    a spring co-axial with, and normally biasing said member in a direction to move said large segment into said second opening, to place said member in a first position in which the member is co-axial with said openings and its second end is dsposed in the path of movement of said engaging head toward said reverse gear actuating lever,
    said spring being compressible by the movement of said engaging head toward said reverse gear actuating lever to move said large segment out of said second opening and to move said small segment into said second opening whereby said member is movable to a second position in which its axis is at an angle to the axis of said openings and its second end is out of the path of movement of said engaging head into engagement with said reverse gear actuating lever.

3. The combination defined in claim 2 in which the periphery of said engaging head and the small segment of the second end of the member are complementarily bevelled.

4. The combination defined in claim 2 in which said small segment includes a bevelled surface at the extreme end of the member, and said small segment includes a portion which connects said large segment with said bevelled surface and against which said engaging head bears when said member is in its second position.

No references cited.

MILTON KAUFMAN, *Examiner.*